United States Patent
Ballamkonda et al.

(10) Patent No.: US 6,775,681 B1
(45) Date of Patent: Aug. 10, 2004

(54) EVALUATION OF GROUPING SETS BY REDUCTION TO GROUP-BY CLAUSE, WITH OR WITHOUT A ROLLUP OPERATOR, USING TEMPORARY TABLES

(75) Inventors: Srikanth Ballamkonda, Sunnyvale, CA (US); Abhinav Gupta, Palo Alto, CA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 338 days.

(21) Appl. No.: 10/084,597

(22) Filed: Feb. 26, 2002

(51) Int. Cl.[7] .............................................. G06F 17/30
(52) U.S. Cl. .......................................... 707/102; 707/3
(58) Field of Search ............................... 707/102, 1, 2, 707/3, 4, 5, 6

(56) References Cited

U.S. PATENT DOCUMENTS

| | | | | |
|---|---|---|---|---|
| 5,469,568 A | * | 11/1995 | Schiefer et al. ................ | 707/2 |
| 5,943,666 A | * | 8/1999 | Kleewein et al. .............. | 707/2 |
| 6,298,342 B1 | * | 10/2001 | Graefe et al. .................. | 707/4 |
| 6,341,281 B1 | * | 1/2002 | MacNicol et al. ............. | 707/3 |
| 6,345,267 B1 | * | 2/2002 | Lohman et al. ................ | 707/2 |
| 2003/0208484 A1 | * | 11/2003 | Chang et al. .................. | 707/5 |

\* cited by examiner

*Primary Examiner*—Diane D. Mizrahi
(74) *Attorney, Agent, or Firm*—Hickman Palermo Truong & Becker LLP; John D. Henkhaus

(57) ABSTRACT

Methods are provided for efficiently evaluating database queries that include a grouping sets specification, by reducing the grouping sets specification to one or more combinations of groupings that are computable with simple GROUP BY clauses, with or without a rollup operator, wherein the GROUP BY clauses and rollup operators are efficient operations that can be computed with a single data sort. Computational costs are further minimized by computing a grouping from records generated from computation of a previously computed grouping. An optimization algorithm is described which determines the respective grouping combinations to which the grouping sets specification is reduced and the respective GROUP BY clauses, to minimize computational costs. Furthermore, an intermediate grouping, that is, a grouping that is not specified by the query, is included in a query evaluation plan in some instances, to compute specified groupings when doing so reduces computational costs.

27 Claims, 6 Drawing Sheets

EVALUATION OF GROUPING SETS BY REDUCTION TO GROUP-BY CLAUSE, WITH OR WITHOUT A ROLLUP OPERATOR, USING TEMPORARY TABLES

CROSS REFERENCE TO RELATED APPLICATIONS

This application is related to commonly owned U.S. patent application Ser. No. 10/077,828 filed on Feb. 15, 2002, entitled "Evaluation of Rollups With Distinct Aggregates By Using a Sequence of Sorts and Partitioning By Measures", and U.S. patent application Ser. No. 10/084,642 filed on Feb. 26, 2002, entitled "Evaluation of Hierarchical Cubes By Nesting Rollups", which are hereby incorporated by reference herein in their entirety for all purposes.

FIELD OF THE INVENTION

The present invention relates generally to database management systems and, more specifically, to techniques for efficiently evaluating database queries including a grouping sets specification.

BACKGROUND OF THE INVENTION

In a database management system (DBMS), data is stored in one or more data containers, each container contains records, and the data within each record is organized into one or more fields. In relational database management systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Database management systems retrieve information in response to receiving queries that specify the information to retrieve. In order for a database management system to understand the query, the query should conform to a database language recognized by the database management system, such as the Structured Query Language (SQL).

In an OLAP (on-line analytical processing) environment or a data warehousing environment, data is often organized into a star schema. A star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables", while the smaller tables are referred to as "dimension tables". Typically, each dimension has "levels" which correspond to columns of the dimension table, which are organized in a hierarchical manner. For example, a TIME dimension might consist of the levels year, quarter, month, and day, corresponding to columns of the TIME table. The hierarchical organization is such that years consist of quarters, quarters consist of months, and months consist of days.

AGGREGATE FUNCTION

An important function for data generation and retrieval performed by a database management system is the generation of aggregated information. Aggregated information is information derived by applying an aggregate function to the values in a column of a subset of rows in a table or on the result of a join of two or more tables. Examples of aggregate functions are functions that sum values, calculate averages, and determine minimum and maximum values. The column that contains the values to which an aggregate function is applied is referred to as the measure.

The subsets of rows to which an aggregate function is applied are determined by values in "group-by" columns. The aggregate information generated by a database management system is presented as a result set having the group-by column(s) and the aggregated measure column. In particular, the result set has one row for each unique value in the group-by column. Each row in the result set corresponds to the group of rows in the base table containing the value for the group-by column of the row. The measure column in the row contains the output of the aggregate function applied to the values in the measure column of the group of rows.

Aggregate information is generated by a database management system in response to receiving an aggregate query. An aggregate query specifies a group-by column, the aggregate measure column, and the aggregate function to apply to the measure values. The following query is provided as an illustration.

SELECT d, SUM(S) sum_s
FROM t
GROUP BY d

Table t contains data representing the sales of an organization. Each row represents a particular sales transaction. For a particular row in table t, column d contains the date of the sales transaction, and s contains the sale amount.

The SELECT clause contains "SUM(s)", which specifies that the aggregate function "sum" is to be applied to the values in column s (aggregate measure) of table t. The query also includes the group-by clause "GROUP BY d", which denotes column d as the group-by column.

Execution of this query generates a result set with a column for d and a column for sum (s). A particular row in the result set represents the total sales (s) for all sale transactions in a given day (d). Specifically, for a particular row in the result set, d contains a unique date value from table t for column d. Column sum_s contains the sum of the sales amount values in column s for the group of rows from t that have the unique date value in column d.

It is often useful to generate aggregate information grouped by multiple columns. For example, table t may also contain column r, a column containing values representing regions. It is may be useful to generate a result set that summarizes sales by region, and for each region, sales date. Such a result set may be generated by referencing column r and d in the group-by clause, as illustrated by the following query.

SELECT d, r SUM (s)
FROM t
GROUP BY r, d

Furthermore, often a query that includes an aggregate function specifies that information from one table is to be aggregated by groupings defined by keys of another table.

GROUP BY CLAUSE

A GROUP BY clause (or operator) groups a database query result into subsets that have matching values for one or more columns. GROUP BY clauses are typically used in conjunction with aggregate functions, thus allowing mathematical operations to be performed on columns specified as arguments in the aggregate functions. The term "simple GROUP BY clause" is used herein in reference to a GROUP BY clause with no extension operations/operators, e.g., GROUP BY r, d, as shown above.

ROLLUP OPERATOR

A useful way to provide information is to generate one result set that groups data by various combinations of columns. For example, a result set may contain a set of rows grouped by region and date, and a set of rows grouped only by region. Such a result set may be generated by submitting a query that includes multiple subqueries operated upon by the union operator. While union queries may be used to generate a result set with multiple groupings, they can be very tedious to write. The programmer of the subquery must write a subquery for each desired grouping, which may become extraordinarily burdensome when the number of groupings desired is relatively large. Furthermore, such queries are very inefficient to execute, as some tables are accessed multiple times.

To avoid this burden, SQL defines extended group-by operators. Extended group-by operators include cube, rollup, and grouping sets. The group-by operators are used to specify groupings that include various combinations of the columns specified as arguments to the operators. For example, using the rollup operator, a query may be written as follows.

SELECT year, quarter, month, SUM(sales)
FROM fact.time
WHERE fact.tkey=time.tkey
GROUP BY rollup(year, quarter, month).

According to techniques that employ sort-based algorithms, execution of this query sorts data produced by the FROM and WHERE clauses on three columns (year, quarter, and month) specified in the GROUP BY clause, in order to logically group the records for efficient aggregation on the column (sales) specified in the aggregate function (SUM). The rollup operator aggregates data across levels specified as the keys (or columns) of the rollup operator, specified in the GROUP BY line. For example, "GROUP BY rollup(year, quarter, month)" produces aggregated results on the following groups:

(year, quarter, month);
(year, quarter);
(year); and
( ).

Note that a rollup on n columns produces n+1 groups. The grand total (referred to as the highest or coarsest) group is the ( ) grouping, and the base (referred to as the lowest or finest) group is the (year, quarter, month) grouping.

GROUPING SETS EXTENSION TO THE GROUP BY CLAUSE

Extensions to the GROUP BY clause have been developed to provide powerful aggregation commands that leverage the processing power of database servers. One such extension included in the Oracle 9*i* database, available from Oracle Corporation, is the grouping sets extension (also referred to herein as an operator or specification). Grouping sets operators perform multiple independent groupings of data records, giving a user the capability to specify exactly the groupings of interest in a SQL GROUP BY clause. Grouping sets operators produce a single result set which is equivalent to a UNION ALL of differently grouped rows, but at a significantly reduced computational cost. Furthermore, the grouping sets operator is more efficient than other grouping operators (e.g., cube or rollup) because it specifies computation of only the groups of interest, thus avoiding unnecessary computation.

The following example query includes a grouping sets operator.

SELECT year, quarter, month SUM(sales)
FROM fact, time
WHERE fact.tkey=time.tkey
GROUP BY GROUPING SETS ((year, quarter, month), (year, month), (year, quarter)).

Evaluation of this query generates results with data aggregated over the three groupings specified by the grouping sets operator. In general, execution of the grouping sets operator aggregates data across levels specified as the arguments (or columns) of the grouping sets specification in the GROUP BY line. Thus, the exact grouping sets specified are generated. In contrast, a cube would produce all of the eight possible groupings of columns (year, quarter, month), of which five are not of interest.

According to one technique that employs sort-based algorithms, execution of this query requires multiple joins of base tables specified in the FROM clause, and multiple sorts and aggregations according to the aggregate function (SUM) and the grouping sets operator. Thus, join, sort and aggregation are required for each grouping specified by the grouping sets operator. For example, three subqueries could be written, combined by UNION ALL commands, to produce the same result as the example query, but at much higher computational cost due to the three scans, joins and sorts required on the base tables (i.e., one per grouping set) in the FROM clause.

Even though using grouping sets is inherently more computationally efficient than using other grouping operators (for example, a cube) due to the specification and computation of only groupings of interest, implementation of grouping sets can additionally benefit from more efficient computational techniques.

Based on the foregoing, it is clearly desirable to provide a scalable mechanism for efficiently computing database queries that include a grouping sets extension to a GROUP BY clause.

SUMMARY OF THE INVENTION

Methods are provided for efficiently evaluating database queries that include grouping sets extension to a GROUP BY clause.

According to one embodiment, the grouping sets operator is reduced to one or more combinations of groupings such that each combination can be computed by a simple GROUP BY clause, with or without a rollup operator. Each GROUP BY clause, with or without a rollup operator, is an inherently efficient computation that can be computed with a single data sort. Computational costs are further minimized by computing a GROUP BY clause, with or without a rollup operator, from records generated from a previously computed grouping. Therefore, temporary tables are used to store records that are generated from one grouping, for access in computing another grouping. An optimization algorithm is described which determines the respective combinations to which the grouping sets operator is reduced and the respective GROUP BY clauses, with the corresponding rollup operator, if any, to minimize computational costs.

According to one embodiment, an intermediate grouping, that is, a grouping that is not specified by the query, is included in a query evaluation plan in some instances. Intermediate groupings are used to compute specified groupings in the grouping sets specification, when doing so reduces computational costs. An intermediate grouping algorithm is described that determines whether costs can be saved by using intermediate groupings. This algorithm is optional and can be applied after the optimization algorithm has been applied on a grouping set specification.

Various implementations of the techniques described are embodied in methods, apparatus, and in computer-readable media.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
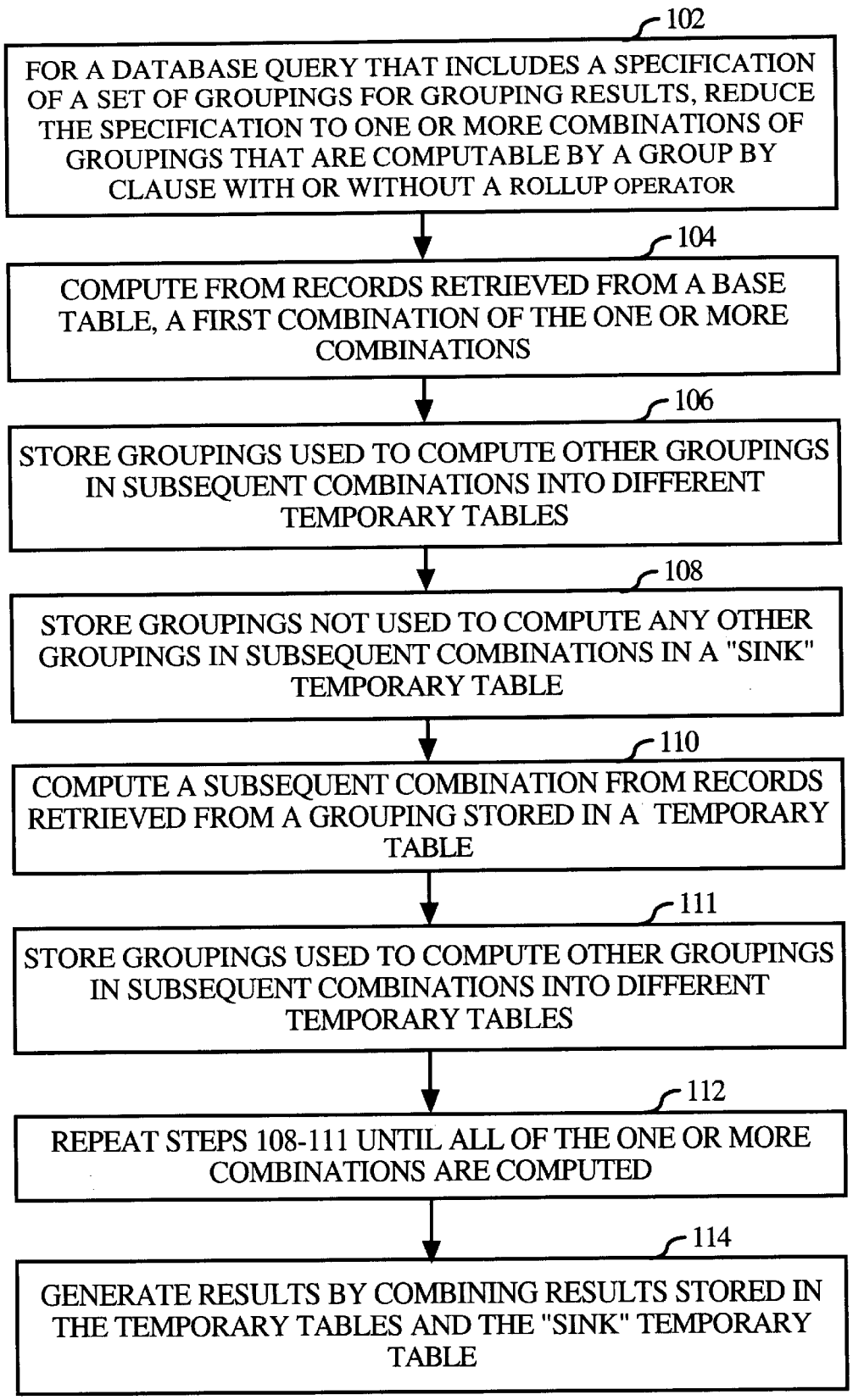
FIG. 1 is a flowchart illustrating a process for evaluating a database query that includes a grouping sets specification.

A method and system are described for efficiently evaluating database queries that include a grouping sets operator. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

REDUCTION OF A GROUPING SETS OPERATOR TO ONE OR MORE COMBINATIONS OF GROUPINGS COMPUTABLE BY A GROUP BY CLAUSE, WITH OR WITHOUT A ROLLUP OPERATOR

Simple GROUP BY clauses without rollup operators and GROUP BY clauses with rollup operators are efficient operations. This primarily results from the fact that these operations can be computed with a single sort of the data in order to logically group the records for efficient grouping and aggregation purposes.

Grouping sets, even though more efficient operations than other grouping operations (for example, a cube) due to the specification and computation of only groupings of interest, can be made even more efficient by reducing them to a combination of groupings that are computable by a GROUP BY clause with or without a rollup operator. For example, the clause, GROUP BY GROUPING SETS ((a, b, c, d), (a, b, c), (a, b)), can be evaluated with a single sort by converting it to, GROUP BY a, b, rollup(c, d), which generates the same specified groupings as would the grouping sets operator. This process is referred to as "reduction," or reducing a grouping sets query into one or more simple GROUP BY clauses with or without a rollup operator. That is, the grouping sets operator is reduced to one or more combination of groupings that are computable with (i) a simple GROUP BY clause; or (ii) a GROUP BY clause with a rollup operator. A grouping sets operator, when reduced, may require more than one GROUP BY clause, in which case the results of each clause are combined. For example, multiple GROUP BY clauses can be combined using a UNION ALL command.

The examples presented herein portray reduction of grouping sets specifications to multiple GROUP BY clauses, but it is noteworthy that some grouping sets specifications may be reduced to include simple GROUP BY clauses, without rollup operators. Furthermore, grouping sets specifications may be reduced to a combination of groupings that are computable by GROUP BY clauses with rollup operators and simple GROUP BY clauses without rollup operators. All such reduction scenarios fall within the scope of the invention, and provide computational advantages with respect to evaluation of queries that include a grouping sets specification.

Furthermore, grouping sets operators can often be reduced in more than one way. For example, the grouping set GROUP BY GROUPING SETS ((a, b, c, d), (a, b, c), (a, b), (a, c), (c, d), (c), (a)), can be reduced as:

G1: GROUP BY a, b, rollup(c, d); which produces (a, b, c, d), (a, b, c), and (a, b);

G2: GROUP BY a, rollup(c); which produces (a, c) and (a); and

G3: GROUP BY c, rollup(d), which produces (c, d) and (c);

with the results from G1–G3 combined with a UNION ALL (or similar) command. An alternate reduction scheme is:

G4: GROUP BY c, rollup(d, (a, b)); which produces (a, b, c, d), (c, d), and (c);

G5: GROUP BY a, rollup(c, b); which produces (a, b, c), (a, c), and (a); and

G6: GROUP BY a, b; which produces (a, b); with the results from G4–G6 combined with a UNION ALL (or similar) command.

In the description and examples presented herein, for purposes of example without limitation, sort-based algorithms are used in the query evaluation process, particularly with respect to the GROUP BY clauses. Note that there are methods other than sort-based, used for computing GROUP BYs, and that the invention is independent of the method used. A general goal is to reduce the execution cost of a query, which, with a sort-based algorithm, is primarily the cost of sorting data. Thus, in the following discussion, minimization of sort costs is the general goal.

Reduction of grouping sets into GROUP BY clauses, with or without rollups, is not trivial. One contribution to an optimized reduction process is to take advantage of a property of aggregate function and grouping computations, whereby a grouping of result records at a particular level can be computed from a previously computed grouping of result records at a finer level. For example, a grouping (a, b) can be computed from grouping (a, b, c) rather than from the base data, which can contain a very large number of records. Hence, there is less data to process, which thereby reduces the execution cost. Computation of grouping sets includes manipulation of data records, which may include aggregation of certain data values specified by an aggregate function, and generating a result set of data records that is grouped according to the grouping sets operator.

One goal is to determine the particular grouping from which a given grouping can be computed efficiently. For example, G2 (referencing columns a and c) can be computed from groupings (a, b, c, d) or (a, b, c). Generally, according to an embodiment, the smaller grouping is chosen, that is (a, b, c), because it is a smaller data set to process than is the grouping (a, b, c, d). Employing this type of heuristic process yields an evaluation of the exemplary groupings as follows:

(a) compute G1 from base data;

(b) compute G2 from grouping (a, b, c), note that grouping (a, b, c) has been computed by G1;

(c) compute G3 from grouping (a, b, c, d), note that grouping (a, b, c, d) has been computed by G1.

USE OF TEMPORARY TABLES

According to one embodiment, which computes a grouping based on data records generated from the computation of another grouping, as described above, data is stored in one or more temporary tables for storage, retrieval and computation of subsequent groupings. Consequently, the temporary tables are combined to generate the final query result. For example, if GROUP BY G2 (i.e., GROUP BY a, rollup(c)) is computed from grouping (a, b, c) of G1, then the result records of grouping (a, b, c) are stored in temporary table t1. Hence, the records can be retrieved from table t1 and used to compute the groupings produced by computation of the G2 operations. Similarly, result records of grouping (a, b, c, d), computed by GROUP BY G1 (i.e., GROUP BY a, b, rollup(c, d)), are stored in another temporary table t2, for use in computing the groupings produced by computation of the G3 operations. Likewise, records associated with groupings that are not used to compute subsequent groupings can all be stored in a single "sink" temporary table t3, for combination with the other temporary tables as part of the final stage of the query evaluation process. In accordance with one embodiment, upon completion of the query evaluation process, the temporary tables are deleted to make associated computational resources available for other uses.

PROCESS FOR EVALUATING A DATABASE QUERY THAT INCLUDES A GROUPING SETS SPECIFICATION BY REDUCTION TO ONE OR MORE COMBINATIONS OF GROUPINGS COMPUTABLE BY A GROUP BY CLAUSE WITH OR WITHOUT A ROLLUP OPERATOR

FIG. 1 is a flowchart illustrating a process for evaluating a database query that includes a grouping sets specification, according to a combination of embodiments of the invention. The method illustrated in FIG. 1 incorporates various embodiments including reduction of grouping sets to groupings computable by GROUP BY clauses, computation of one combination from records generated by computation of another combination, and the use of temporary tables for storing result records for various groupings based on whether other groupings are computed therefrom. Note that each of these embodiments can also be practiced singularly, without the combination of the other embodiments. Also note that sort-based algorithms are used in the examples presented below.

A query that includes a grouping sets specification and that is presented for illustrative purposes, follows.

SELECT year, quarter, month, SUM(sales)
FROM fact, time
WHERE fact.timekey=time.timekey
GROUP BY GROUPING SETS((year, quarter, month), (year, month), (quarter, month), year, ( )).

At step 102, the grouping sets specification is reduced to one or more combinations of groupings that are computable by a GROUP BY clause with or without a rollup operator. For example, the grouping sets (year, quarter, month), (year, month), (quarter, month), (year), and ( ), can be computed by two clauses/operators, that is:

Gx: GROUP BY quarter, month, rollup(year); which produces the groupings (year, quarter, month) and (quarter, month); and Gy: GROUP BY rollup(year, month); which produces the groupings (year, month), (year), and ( ).

Thus, it is shown that all of the groupings specified in the GROUPING SETS operator can be computed from the two preceding GROUP BY clauses. Logically, the original query is rewritten, or represented by, the following query:

SELECT year, quarter, month SUM(sales)
FROM fact, time
WHERE fact.timekey =time.timekey
GROUP BY quarter, month, rollup(year)
UNION ALL
SELECT year, null, month SUM(sales)
FROM grouping(year, quarter, month)
GROUP BY rollup(year, month).

Note that grouping(year, quarter, month) of Gy is computed from Gx

At step 104, a first combination of groupings is computed from a join of base records, that is, database records that are retrieved from base tables. For example, the groupings (year, quarter, month) and (quarter, month) of the first combination are computed from base table records using GROUP BY clause Gx. Note that using sort based techniques, a sort on (quarter, month, year) can be used to compute both groupings. At step 106, groupings used to compute other groupings in subsequent combinations are stored in temporary tables. For example, records associated with the grouping (year, quarter, month) are stored in a temporary table, t1, whereby they can be retrieved and processed in order to compute the operator rollup (year, month) in Gy. Note that more than one combination may be computed from another grouping, although not the case in the present example.

At step 108, groupings that are not used to compute any other groupings in subsequent combinations are stored in a "sink" temporary table (e.g., t2). For example, the grouping (quarter, month), which is generated by computation of GROUP BY quarter, month, rollup(year), is stored in the sink temporary table. The records stored in the sink temporary table (at step 108) are retrievable for eventual combination with the records stored in the other temporary table or tables (e.g., at step 106).

At step 110, a subsequent combination is computed from records retrieved from a grouping stored in a temporary table. For example, the groupings (year, month), (year), and ( ), which are generated by computation of clause GROUP BY rollup(year, month), are computed from the grouping (year, quarter, month) stored in temporary table, t1, rather than from base table records. The number of records in the base table is typically significantly greater than the number of records in the grouping result table, thus the number of records requiring processing is minimized by accessing the grouping result records already computed instead of the base table records. Hence, step 110 helps to minimize computational costs associated with GROUP BY clause computation, which are, generally, the cost of data sorts in sort based algorithms for GROUP BY clauses.

At step 111, all of the records computed at step 110 are stored in a sink table (e.g., t2), as they are not required by any subsequent groupings.

At step 112, steps 108–111, inclusive, are repeated until all of the one or more combinations of groupings are computed. In the example, the query is reduced to only two combinations, therefore, there are no more combinations of groupings that need to be computed.

At step 114, results are generated by combining results stored in the temporary tables, including the sink temporary table. For example, all of the temporary tables (i.e., t1 and sink) are combined to produce the final result records. A representative query follows:

SELECT *
FROM t1
UNION ALL
SELECT *
FROM t2 where t2 denotes the sink table. Note that the presence of additional combinations of groupings that would require additional temporary tables would require additional union operations.

The method described in reference to FIG. 1 is described generally. For example, permutations of the general method include, as discussed above: the original query may be reduced to more than two combinations, and multiple combinations may be computed from a single previous combination.

USING CARDINALITIES TO OPTIMIZE EVALUATION OF GROUPING SETS OPERATORS

The term cardinality refers to the number of cardinal, or basic, items in a set. For example, for a table such as a database table, the number of rows is used to define the cardinality of the table (table cardinality). To assist in efficiently evaluating database queries that include grouping sets, a concept of cardinality is used to indicate to an optimizer program, prior to the evaluation process, the number of rows generated for each grouping specified in the query and, thus, the number of rows that are considered during the query evaluation process. Generally, the goal is to compute groupings such that execution costs are minimized.

In one embodiment, the number of columns in each grouping and the number of possible values for each column (column cardinality) contained in the grouping, are used to estimate the number of rows that would be generated in computing a particular grouping. The estimate of the number of rows that would be generated is a cardinality for that particular grouping.

Use of cardinalities that are computed for groupings specified in a query is described in more detail below.

OPTIMIZATION ALGORITHM

According to an embodiment of the invention, an optimization algorithm, with the goal of minimizing computational costs such as data sort costs, determines a query evaluation plan by computing a grouping of interest (e.g., (a, b, c)) from a smallest grouping of data from which this grouping can be computed (e.g., (a, b, c, d) versus the base data set), and by computing larger groupings before smaller groupings.

Another exemplary query that includes a grouping sets operator, and which will be used to illustrate an embodiment of the invention, follows:

SELECT year, quarter, month, SUM(sales)
FROM fact, time
WHERE fact.timekey=time.timekey
GROUP BY GROUPING SETS((year, quarter, month), (year, quarter), (quarter, month), (year, month), year, quarter, month, ( )).

In general, according to one technique for evaluating the query, using a sort-based algorithm, execution of this query sorts the data obtained from the join of two tables (fact and time) specified in the FROM line, on the three columns (year, quarter, and month) specified in the GROUP BY clause. In addition, according to an embodiment of the invention described above, execution of the query sorts data on (year, quarter, month) and computes the groupings (year, quarter, month) and (year, quarter) by rolling up on month (i.e., by specification of GROUP BY year, quarter, rollup (month)). Then, the groupings (year, month) and (month) are computed by using the clause GROUP BY year, rollup (month) from the grouping (year, quarter, month), which is smaller than the base data tables (i.e., fact and time). Groupings (quarter) and (year, quarter) are also computed from grouping (year, quarter, month) as opposed to the base tables by using the clause GROUP BY quarter, rollup(year). Furthermore, groupings ( ) and (year) are computed from grouping (year, quarter) as opposed to computing from (year, month), (year, quarter, month) or base tables, by using the clause GROUP BY rollup(year). The details of the algorithm are described below.

Figure 2A:
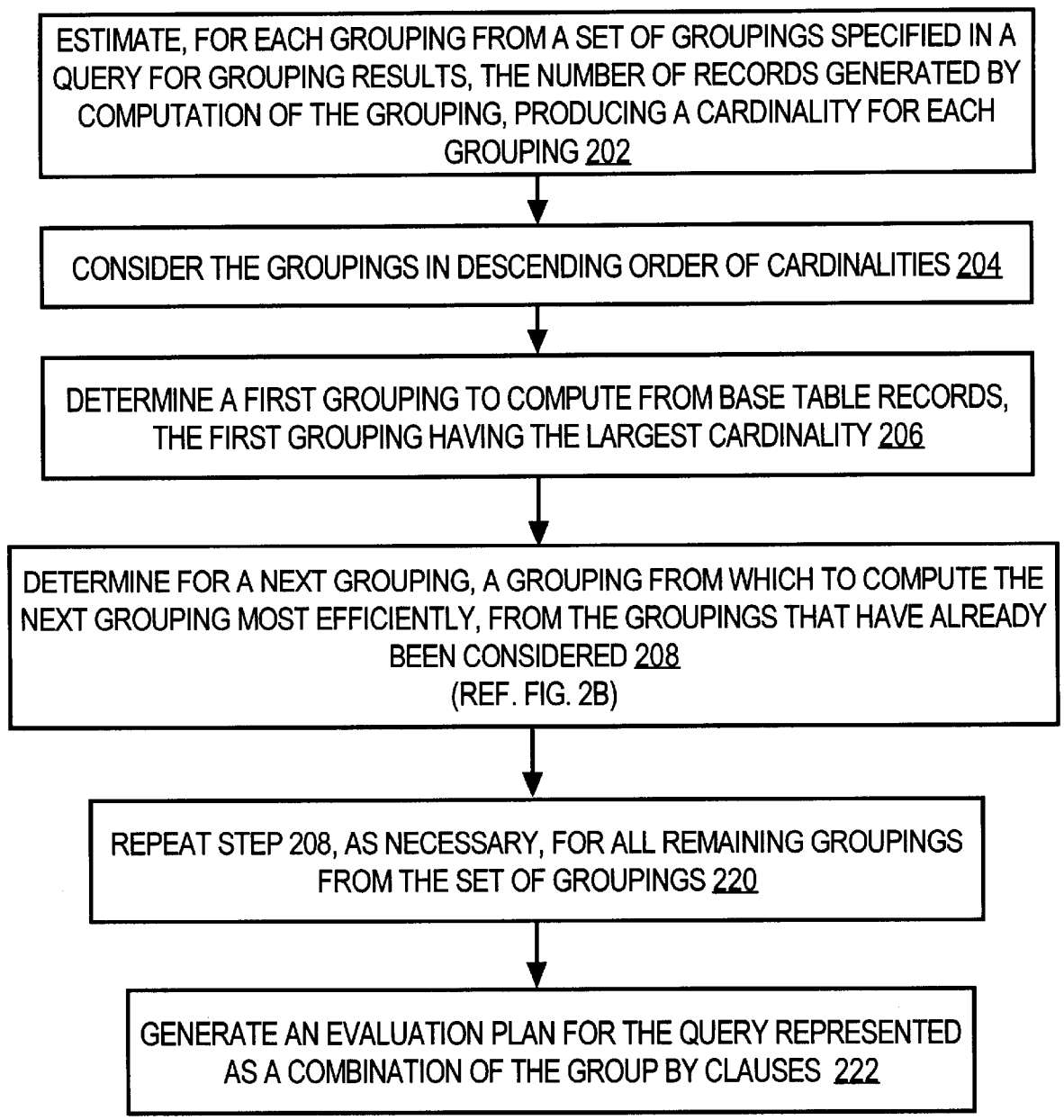
FIG. 2A is a flowchart illustrating a process for generating an evaluation plan for a database query that includes a grouping sets specification.
Figure 2B:
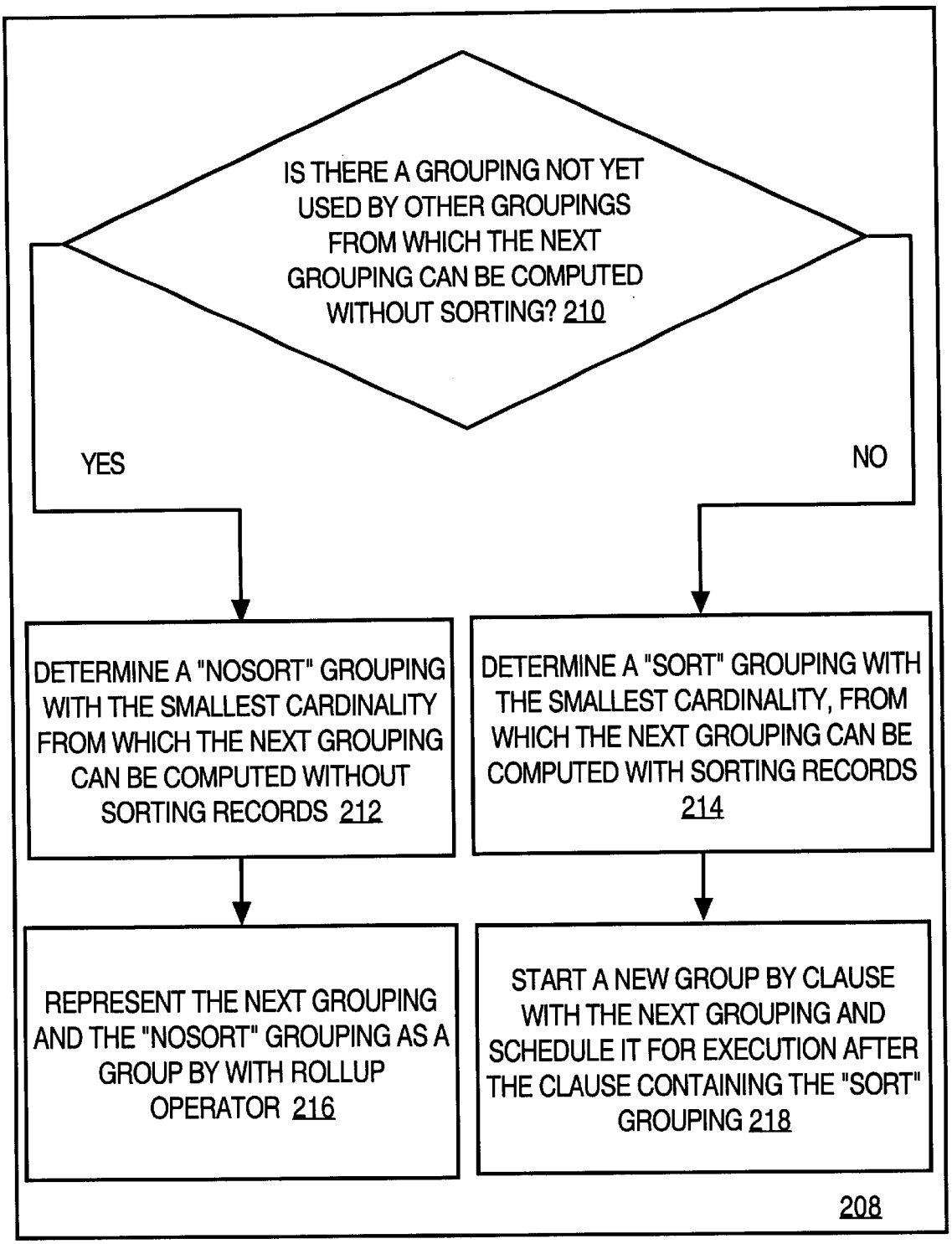
FIG. 2B, is a flowchart illustrating a process for generating an evaluation plan for a database query that includes a grouping sets specification, continuing from FIG. 2A.
Figure 3A:
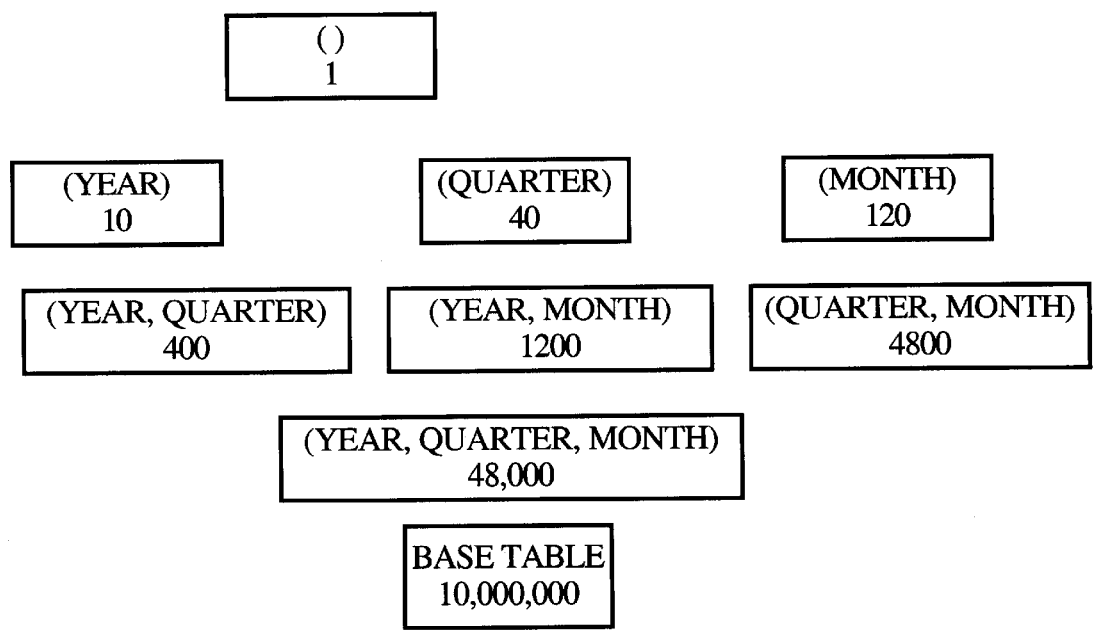
FIGS. 3A and 3B are diagrams for visually depicting use of the method illustrated in FIGS. 2A and 2B.
Figure 3B:
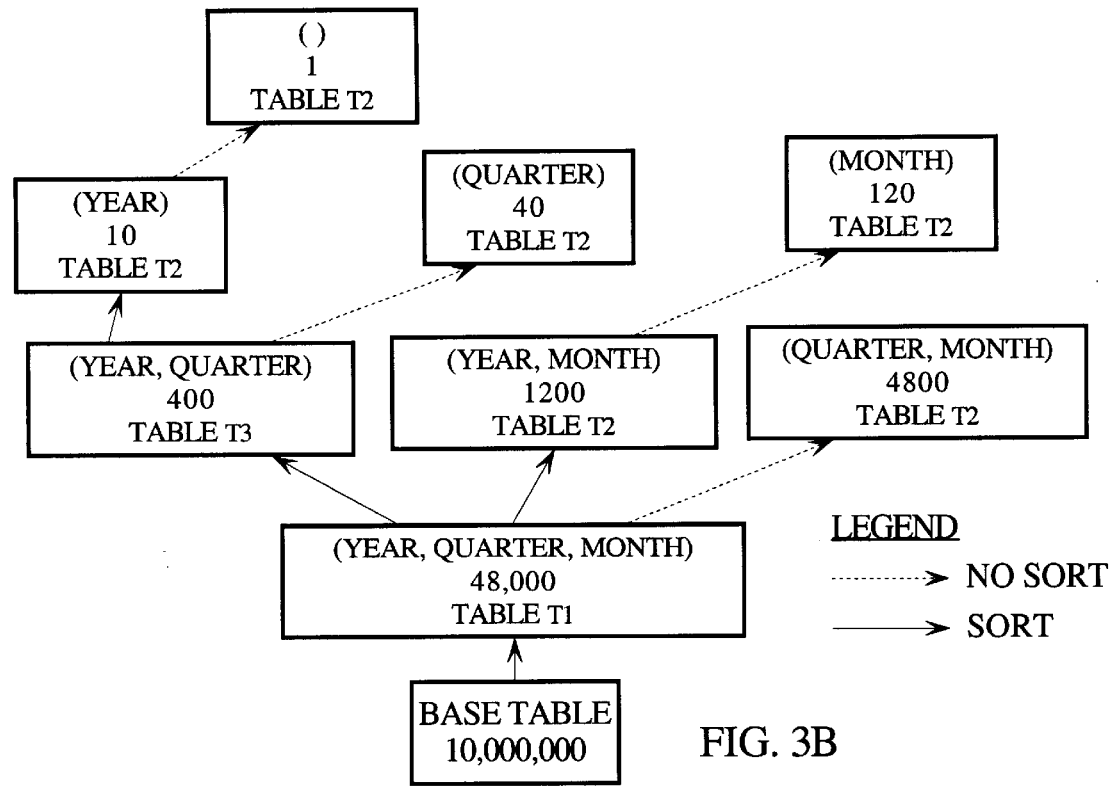

FIGS. 2A and 2B are flowcharts illustrating a process for generating an evaluation plan for a database query that includes a grouping sets specification, according to an embodiment of the invention. FIGS. 3A and 3B are diagrams for visually depicting use of the method illustrated in FIGS. 2A and 2B.

At step 202, for each grouping from a set of groupings specified in a database query (in a grouping sets specification), the number of records generated by computation of each of the groupings is estimated, producing a cardinality as described above. Reference to FIG. 3A shows each grouping specified in the above query, along with cardinalities computed according to step 202. The data in this example represent a ten-year period, thus, the following cardinalities represent the number of possible values for each column/key:

C (year)=10 (10 years);

C (quarter)=40 (10 years * 4 quarter/year); and

C (month)=120 (10 years * 12 months/year).

Multiplying base cardinalities, to estimate cardinalities for groupings with multiple keys, produces:

C (year, quarter)=400 (C (year) * C (quarter)=10 * 40);

C (year, month)=1200 (C (year) * C (month)=10 * 120);

C (quarter, month)=4800 (C (quarter) * C (month)=40 * 120); and

C (year, quarter, month)=48,000 (C (year) * C (quarter) * C (month)=10 * 40 * 120).

FIG. 3A depicts all of the specified groupings along with their cardinalities, in a hierarchical manner based on the number of grouping keys (which typically correlates with the cardinalities). At step 204, the groupings are considered in descending order of cardinalities, applicable to steps 206–220. At step 206, a first grouping is determined as the first grouping to compute, based on cardinalities. In one embodiment, the first grouping is the grouping with the largest cardinality. For example, grouping (year, quarter, month) is determined as the first grouping, since it has the largest cardinality (48,000). Furthermore, the first grouping is computed from the base table. According to one embodiment, grouping (year, quarter, month) is stored in a temporary table so that one or more subsequent groupings can be computed therefrom. In one embodiment, determining whether the result of a grouping needs to be stored in a temporary table and how many temporary tables are required, according to the process described above, are determined after the entire execution plan is obtained.

At step 208, for the next grouping (based on descending through the order of cardinalities), a grouping from which the next grouping can be computed is determined from the groupings that have already been considered. The grouping which is chosen is the one from which it is most efficient to compute the next grouping. The heuristic used for sort-based algorithms is such that it is always efficient to avoid sorts. In the example, grouping (quarter, month) is the next grouping encountered based on its cardinality (4800), hence, it is now the "next" grouping. Step 208 comprises steps 210–218, which are depicted in FIG. 2B. Grouping (quarter, month) can be computed from either the base table records or from the records for grouping (year, quarter, month). At step 208, the groupings that have already been considered (i.e., in descending order of cardinalities, as described at step 204) are considered in ascending order of cardinalities to determine the grouping from which to compute the next grouping. In the example, the only grouping that has been considered is the grouping (year, quarter, month).

Referring to FIG. 2B, at decision block 210, it is determined whether there is a grouping from which the next grouping can be computed without having to sort the records, from groupings not yet used by other groupings. If decision block 210 yields a positive decision, then, at block 212, a grouping with the smallest cardinality from which the next grouping can be computed without sorting (i.e., a "nosort" grouping), is determined. For example, grouping (quarter, month) can be computed from grouping (year, quarter, month) without sorting the records from the (year, quarter, month) grouping. If there is not a grouping not yet used from which the next grouping can be computed without a sort, then the method proceeds to step 214. At step 214, a grouping with the smallest cardinality from which the next grouping can be computed with sorting (i.e., a "sort" grouping), is determined. In the example, step 214 is not applicable at this stage of the process.

At step 216, depicted in FIG. 2B, the next grouping and the grouping determined at step 212 (i.e., the nosort grouping) are represented as a GROUP BY clause with a rollup operator. In the example, the next grouping is (quarter, month) and the grouping from which it is computed is the first grouping, that is, (year, quarter, month). Hence, these two groupings are represented as GROUP BY quarter, month, rollup(year); which produces the two groupings. FIG. 3B depicts this GROUP BY clause with rollup operator by connecting the two groupings with a dashed line, meaning that grouping (quarter, month) is computed from grouping (year, quarter, month), without a sort of the records from grouping (year, quarter, month). At step 220, step 208 (i.e., steps 210–218) is repeated, as necessary, for all of the remaining groupings from the set of groupings. Thus, in the example, processing returns to determine, for the next grouping, a grouping from which to compute the next grouping from the groupings already considered.

In the example, returning to step 208 while still considering the groupings in descending order of cardinalities, the grouping (year, month) is considered the next grouping since it has the next highest cardinality (1200), as depicted in FIG. 3A. At step 210, it is determined whether the next grouping can be computed from a grouping not yet used by other groupings, without sorting. In the example, it is determined that grouping (year, month) cannot be computed from grouping (quarter, month). Thus, grouping (year, quarter, month) is considered next. Grouping (year, month) can be computed from grouping (year, quarter, month). Since grouping (year, quarter, month) has already been used by another grouping (i.e., (quarter, month)) without sorting it, the decision at block 210 is negative. Therefore, the method proceeds to step 214 to determine a "sort" grouping with the smallest cardinality from which grouping (year, month) can be computed, with a sort. In the example, it is determined to sort grouping (year, quarter, month) to compute grouping (year, month), at step 214. Hence, FIG. 3B shows a solid line from grouping (year, quarter, month) to grouping (year, month), indicating that a sort of the grouping (year, quarter, month) is used to compute grouping (year, month). Processing proceeds to step 218, where a new GROUP BY clause, potentially with a rollup operator, is started based on the "next" grouping (i.e., (year, month)), and the clause is scheduled for execution after the clause containing the "sort" grouping determined at step 214 (i.e., after GROUP BY quarter, month, rollup(year)). Processing returns to step 208 to consider the next grouping, and to determine from which grouping it is computed.

Continuing with the example, the next grouping (in descending order) is grouping (year, quarter). Considering the groupings that have already been considered (in ascending order), it is determined whether there is a grouping that has not yet been used by another grouping, from which grouping (year, quarter) can be computed without a sort, step 210. Groupings (year, month), (quarter, month), and (year, quarter, month) are considered, in order. The only grouping from which grouping (year, quarter) can be computed is grouping (year, quarter, month). Since grouping (year, quarter, month) has already been used by another grouping (i.e., grouping (quarter, month)) without sorting it, the decision at block 210 is negative. Processing continues to step 214, where it is determined to sort grouping (year, quarter, month) to compute grouping (year, quarter). Hence, FIG. 3B shows a solid line from grouping (year, quarter, month) to grouping (year, quarter), indicating that a sort of the records for grouping (year, quarter, month) is used to compute grouping (year, quarter). Processing proceeds to step 218, where a new GROUP BY clause (potentially with a rollup operator) is started based on the "next" grouping (i.e., (year, quarter)), and the clause is scheduled for execution after the previous clause containing the "sort" grouping determined at step 214 (i.e., after GROUP BY quarter, month, rollup(year)). Processing returns to step 208 to consider the next grouping, and to determine from which grouping it is computed.

The next grouping (in descending order) is grouping (month). Considering the groupings that have already been considered (in ascending order), it is determined whether there is a grouping not yet used by another grouping, from which grouping (month) can be computed without a sort, step 210. Groupings (year, quarter), (year, month), (quarter, month), and (year, quarter, month) are considered, in order. The first grouping from which grouping (month) can be computed without a sort is grouping (year, month), step 212. Proceeding to step 216, the next grouping and the nosort grouping are represented as a GROUP BY clause with rollup operator. Hence, grouping (month) is associated with grouping (year, month) and represented as a GROUP BY clause with rollup operator which was previously started at step 218, that is: GROUP BY month, rollup(year). FIG. 3B depicts this relationship by connecting the two groups with a dashed line. Processing returns to step 208 to consider the next grouping, and to determine from which grouping it is computed.

The next grouping (in descending order) is grouping (quarter). Considering the groupings that have already been considered (in ascending order), it is determined whether there is a grouping from which grouping (quarter) can be computed, without a sort, step 210. Groupings (month), (year, quarter), (year, month), (quarter, month), and (year, quarter, month) are considered, in order. The first grouping from which grouping (quarter) can be computed without a sort is grouping (year, quarter), step 212. At step 216, grouping (year, quarter) and grouping (quarter) are represented as a GROUP BY clause with a rollup operator which was previously started at step 218, that is: GROUP BY quarter, rollup(year). FIG. 3B depicts this relationship by connecting the two groups with a dashed line.

The next grouping (in descending order) is grouping (year). Considering the groupings that have already been considered (in ascending order), it is determined whether there is a grouping from which grouping (year) can be computed, without a sort, step 210. Since all groupings from which grouping (year) can be computed, that is, (year, quarter, month), (year, month), and (year, quarter) have already been used, that is, they have been assigned to a GROUP BY clause with a rollup operator, the decision at block 210 is negative. That is, no groupings that are not yet used by other groupings are available to compute grouping (year) without a sort. Thus, considering the previously considered groupings in ascending order determines that grouping (year, quarter) is the grouping with the smallest cardinality, from which grouping (year) can be computed with a sort, at step 214. Processing proceeds to step 218, where a new GROUP BY clause (potentially with rollup operator) is started based on the "next" grouping, and the clause is scheduled for execution after the clause containing the "sort" grouping determined at step 214 (i.e., after GROUP BY quarter, rollup(year)). FIG. 3B depicts this relationship by connecting the two groups with a solid line.

The next and final grouping is grouping ( ), sometimes referred to as the "all" grouping. Considering the groupings that have already been considered, in ascending order, it is determined whether there is a grouping from which grouping ( ) can be computed, without a sort, step 210. Grouping (year) is the first, and smallest, to consider from which grouping ( ) can be computed without a sort, step 212. At step 216, grouping (year) and grouping ( ) are represented as a GROUP BY clause with rollup operator, that is: GROUP BY rollup(year). FIG. 3B depicts this relationship by connecting the two groups with a dashed line. In the example, all groupings of the set of groupings have been considered, thus, processing continues at step 222.

Finally, at step 222 of FIG. 2A, an evaluation plan for the original query is generated as a combination of the GROUP BY clauses. For example, a logical version of the representative query follows:

SELECT year, quarter, month, SUM(sales)
FROM fact, time
WHERE fact.timekey=time.timekey
GROUP BY quarter, month, rollup(year)
UNION ALL
SELECT year, null, month, SUM(sales)
FROM grouping(year, quarter, month)
GROUP BY month, rollup(year)
UNION ALL
SELECT year, quarter, null, SUM(sales)
FROM grouping(year, quarter, month)
GROUP BY quarter, rollup(year)
UNION ALL
SELECT year, null, null, SUM(sales)
FROM grouping(year, quarter)
GROUP BY rollup(year).

Considering the use of temporary tables, FIG. 3B depicts tables to which the various groupings are stored for the example evaluation plan. As discussed, according to one embodiment, each grouping from which another grouping is to be computed by sorting the grouping, is stored in a separate temporary table; and each grouping from which no other groupings are computed with sorting, is stored in a single temporary, or sink, table. For example, grouping (year, quarter, month) is sorted and used to compute both grouping(year, month) and grouping(year, quarter), hence, its records are stored in a separate temporary table, t1. Furthermore, groupings ( ), (year), (quarter), (month), (quarter, month), and (year, month) are all stored in a single temporary table, t2, since the associated groupings are not used to compute other groupings with a sort. Grouping (year, quarter) is sorted to compute grouping (year), hence, its records are stored in a separate temporary table, t3. Recall that in one embodiment, determining whether the result of a grouping needs to be stored in a temporary table and how many temporary tables are required, according to the process described above, are determined after the entire execution plan is obtained.

In one embodiment, the groupings are assigned to temporary tables through use of conditional clauses in query evaluation processing, in conjunction with the use of grouping identifiers that uniquely identify each specified grouping set. A grouping identifier function, grouping_id, is described in U.S. patent application Ser. No. {SERIAL NO} filed on {DATE}, entitled "Evaluation of Hierarchical Cubes By Nesting Rollups." For example, a conditional clause associated with a GROUP BY clause with rollup operator may be:

if grouping_id(year, quarter, month)=0, then insert into table t1,
else, insert into table t2.

Such conditional clauses facilitate the identification of groupings and the assignment to a specific temporary table. An algorithm for assigning grouping records to temporary tables can be implemented as a concurrent process with the optimization algorithm presented above, or it can be implemented as an independent algorithm that acts on the results of the optimization algorithm.

INTERMEDIATE GROUPINGS

Figure 4:
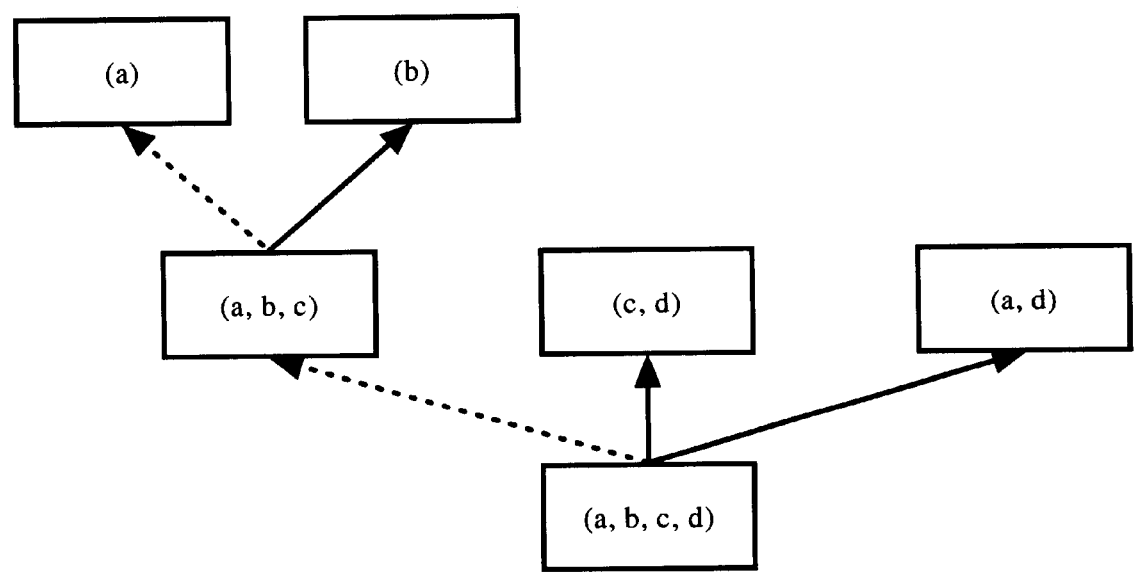
FIG. 4 is a block diagram visually depicting relationships between groupings.

According to an embodiment, in some instances, computational costs are reduced by creating an intermediate grouping from which to compute a specified grouping. As an example, consider the grouping sets specification: GROUPING SETS((a, b, c, d), (a, b, c), (a), (b), (c, d), (a, d). An evaluation plan utilizing the optimization algorithm according to the embodiments described above determines the following relationships, as illustrated in FIG. 4:

grouping (a) can be computed from grouping (a, b, c);
grouping (a, b, c) can be computed from grouping (a, b, c, d);
grouping (b) can be computed from grouping (a, b, c);
grouping (c, d) can be computed from grouping (a, b, c, d); and grouping (a, d) can be computed from grouping (a, b, c, d).

The groupings (c, d) and (a, d) are of particular interest in this example. Assume that groupings (c, d) and (a, d) require sorting of records from grouping (a, b, c, d) for computation. In this case, and in many others, it may be more computationally efficient to compute an intermediate grouping (a, c, d), which is not required by the GROUPING SETS operator, from which to compute the groupings (c, d) and (a, d). This would be the case when the cardinality of the "b" field is substantially large.

An example of computing alternative computations costs is now presented. Let size_xy indicate the size of the (x, y)grouping. Generally, the cost of computing a group consists of the cost of a scan and the combined cost of a sort and aggregation of a data table.

Estimates of each of the two costs (i.e., sort and aggregation) are as follows:

(1) Cost of scanning grouping (x, y)=cost of accessing each record in grouping (x, y)=size_xy; and (2) Cost of aggregating (x, y) from grouping (x, y, z) using a sort=(size of input to sort) * log(size of output of aggregation)=size_xyz * log(size_xy).

Thus, for an alternative 1 (a1), which computes the groupings (c, d) and (a, d) from the grouping (a, b, c, d), a cost evaluation follows:

cost of computing (a, d) from (a, b, c, d)=size_abcd [i.e., for a scan of abcd]+size_abcd*log(size_ad) [i.e., for a simultaneous sort and aggregation on ad];

cost of computing (c, d) from (a, b, c, d)=size_abcd [i.e., for a scan of abcd]+size_abcd*log(size_cd) [i.e., for a simultaneous sort and aggregation on cd];

Total cost (a1)=2*size_abcd+size_abcd*log(size_ad)+size_abcd*log(size_cd). Note that the log function is used to estimate the cost associated with sorting, which depends on the number of resulting records that are sorted and which behave in a manner similar to a log function.

For alternative 2 (a2), which computes groupings (c, d) and (a, d) from an intermediate grouping (a, c, d), a cost evaluation follows:

cost of computing (a, c, d) from (a, b, c, d)=size_abcd+size_abcd*log(size_acd);

cost of computing (a, d) from (a, c, d)=size acd (i.e., for scan of acd);

cost of computing (c, d) from (a, c, d)=size_acd+size_acd*log(size_cd);

assuming grouping (a, d) is computed from grouping (a, c, d) without requiring a sort of the associated records, i.e., by a rollup operator.

Total cost (a2)=size_abcd+2* size_acd+size_abcd*log(size_acd)+size_acd*log(size_cd).

The decision is made to compute intermediate grouping (a, c, d) if the cost of a2 is less than the cost of a1. To further the example, assume the following cardinalities:

card(a)=100;
card(b)=10,000;
card(c)=1;
card(d)=10.

Then, a1 $10^7 * 4$ (approx.); and a2 $10^7 * 3 + 10^3 * 2$ (approx.).

Thus, a2<a1, so alternative 2 is chosen, and intermediate grouping (a, c, d) is computed as part of the overall query evaluation.

According to one embodiment, an algorithm to introduce intermediate groupings into an evaluation plan obtained as described above according to optimization algorithm embodiments, is as follows. First, pertinent terms are introduced, with reference to FIG. 3B. "Node" refers to a grouping, indicated by each of the blocks of FIG. 3B (excluding the "base table"). "Sort edge" from x to y refers to a computation of grouping y from grouping x by sorting grouping x. For example, the solid line from grouping (year, quarter, month) to grouping (year, month) in FIG. 3B. "Nosort edge" from x to y refers to a computation of grouping y from grouping x without sorting grouping x. For example, the dashed line from grouping (year, quarter, month) to grouping (quarter, month) in FIG. 3B. Note that the presence of a nosort edge between x and y indicates that groupings x and y can be computed together by a GROUP BY clause with a rollup operator. For example, (year, quarter, month)→nosort (quarter, month) can be computed by an operation, GROUP BY quarter, month, rollup(year). In general, $(a\_1, \ldots, a\_n) \rightarrow nosort(a\_1, \ldots, a\_n-1) \rightarrow nosort(a\_1, \ldots, a\_i)$, can be computed by an operation GROUP BY $a\_1, \ldots, a\_i$, rollup($a\_i+1, \ldots, a\_n$).

Let Nd={s_1, s_2, ..., s_n} be the set of nodes having outgoing sort edges, where a node s_i has E_i={ei_1, ..., ei_mi} outgoing sort edges, and where each edge ei_j is associated with a sort cost ci_j, and where ei_j is an edge between nodes s_i and s_j.

Nodes Nd are considered in decreasing order of their sizes (cardinalities), and for each node s_k considered, its outgoing edges E_k are considered in descending order of their costs c_k. That is, preference is given to expensive computations to attempt to introduce intermediate groups for reducing the sorting costs. Set Nd is maintained in descending order of node sizes whereas set E_i is maintained in descending order of edge costs. The following illustrates an algorithm that determines whether intermediate groupings are beneficial, according to one embodiment of the invention.

1. for each node s_i in Nd
   do
1.1 for each edge ei_j in E_i
   do
1.1.1 for each edge ei_k in {ei_j+1, ..., ei_mi}
   do
1.1.1.1 compute the reduction in cost combining edge ei_j with ei_k and let this be r_jk
   done
1.1.2 determine the best edge with which to combine edge ei_j and let it be ei_b (ei_b is an edge from node s_i to node s_b)
1.1.3 if the best edge is found
   then
1.1.3.1 form an intermediate node NODE_INTER (s_t) resulting from combining ei_j and ei_b
1.1.3.2 insert node NODE_INTER into the set Nd while preserving its order
1.1.3.3 replace the edge ei_j with an edge between s_i and NODE_INTER (note that this replacement will preserve th order of E_i)
1.1.3.4 remove edge ei_b from E_i
1.1.3.5 go to step 1.1.1.1 to attempt to further combine the newly created edge between s_i and NODE_INTER with other edges
   endif
   done
   done At step 1.1.1.1, the reduction in cost by combining ei_j and ei_k is obtained by considering the original (s_i→sort→s_j and s_i→sort→s_k) and modified (s_i→sort→s_t→nosort→s_j and s_t→sort→s_k) plans of evaluating nodes s_j and s_k from s_i in conjunction with the following cost computation:

reduction in cost=(ci_j+ci_k)−(ci_t+ct_k+ct_j+cost of writing intermediate grouping s_t into a temporary table);

where ci_j is the cost of computing s_i from s_i;
where ci_k is the cost of computing s_k from s_i;
where ci_t is the cost of computing s_t from s_i;
where ct_k is the cost of computing s_k from s_t;
where ct_j is the cost of computing s_j from s_t.

Step 1.1.2, determining the best edge with which to combine ei_j, comprises the following:

1.1.2.1 determine the maximum reduction value among r_jk for $j+1 \leq k \leq mi$;

1.1.2.2 where the best edge ei_b is an edge corresponding to the maximum reduction determined in step 1.1.2.1.

Step 1.1.3.1, which forms NODE_INTER resulting from combining edges ei_j and ei_b comprises performing a UNION of group-by keys of s_j and s_b. For example, if s_j is grouping (a, b, c) and s_b is grouping (a, c, d), then NODE_INTER is grouping (a, b, c)∪(a, c, d)=(a, b, c, d).

The intermediate grouping algorithm is optional and can be applied after the optimization algorithm has been applied on a grouping set specification, as described above. Furthermore, the intermediate grouping algorithm described is but one implementation of the intermediate grouping concept, for other algorithms can be used to implement the concept of using intermediate groupings to reduce costs when generating a query evaluation plan or evaluating a query.

HANDLING ALGEBRAIC AGGREGATES

Algebraic aggregate functions in the SQL language are relatively straightforward to compute when evaluating queries that logically include a GROUP BY clause with a rollup operator. This is because aggregates computed for one grouping can be aggregated again for another associated higher-level grouping (i.e., groupings which are both computed from the same GROUP BY clause) to produce the desired results. However, computation of non-algebraic, or holistic, aggregates (e.g., DISTINCT aggregates, inverse distribution functions, and first/last aggregates) are not as straightforward because a holistic aggregate for a grouping cannot be computed from other groupings. For example, a DISTINCT aggregate for grouping (year, month) cannot be directly or simply computed from the result set for grouping (year, quarter, month). Hence, in one embodiment, in the presence of a holistic aggregate function, base data is materialized into a temporary table and each rollup or simple GROUP BY identified by the optimization algorithm is computed from the base data. Furthermore, intermediate groupings are not used in the presence of holistic aggregates.

One method for minimizing computation costs for database queries that include GROUPING SETS (which are reduced to simple GROUP BY clauses and/or GROUP BY clauses with rollup operators) and a DISTINCT aggregate function utilizes serial sorting as described in related U.S. patent application Ser. No. 10/084,642 filed on Feb. 26, 2002 entitled "Evaluation of Rollups With Distinct Aggregates By Serial Sorting and Partitioning By Measures." Application of serial sorting to the rollup operator at least saves some computational costs by reducing costs associated with sorts and duplicate record elimination.

HARDWARE OVERVIEW

Figure 5:
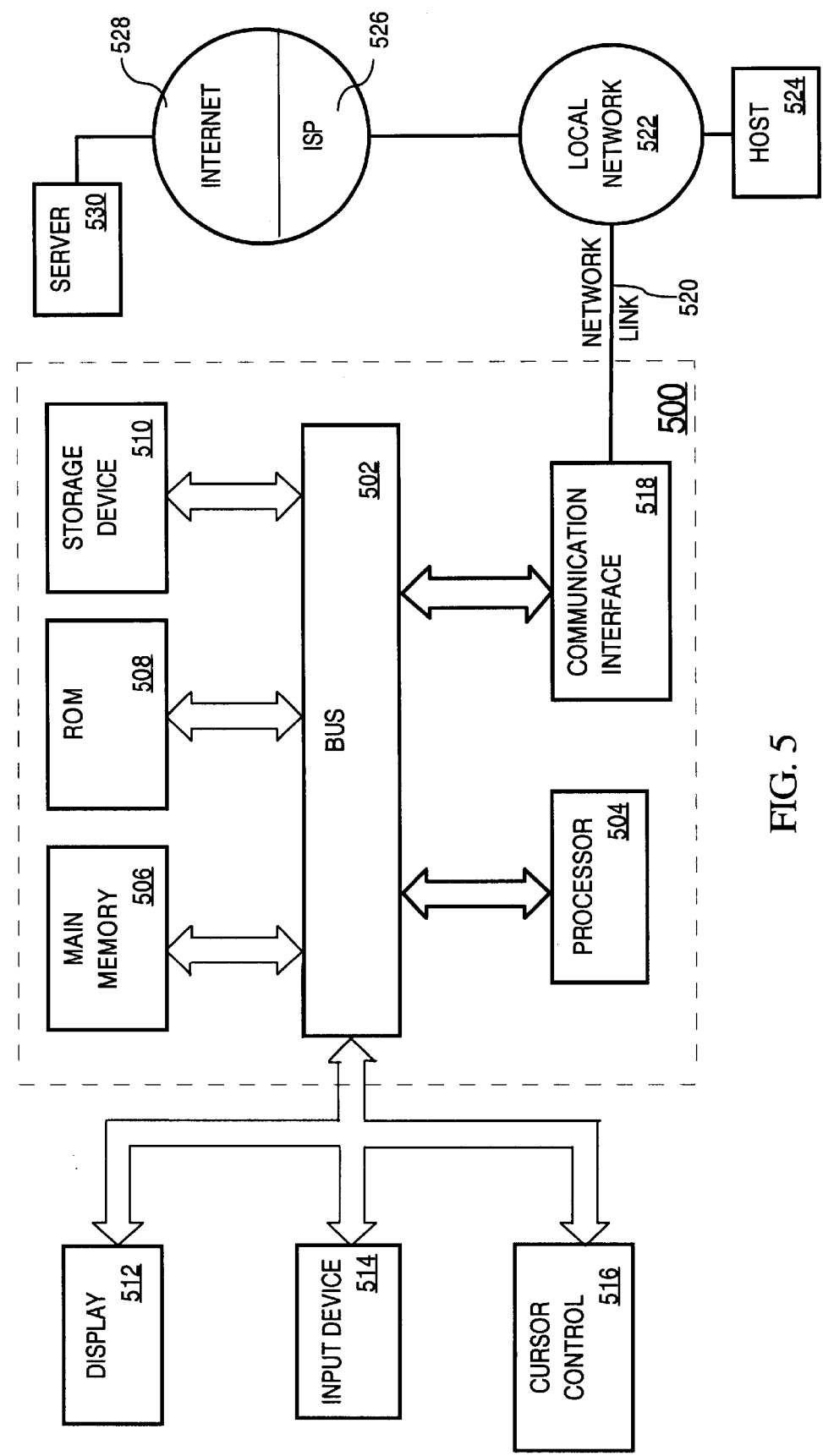
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, optical disk, or magneto-optical disk, is provided and coupled to bus 502 for storing information and instructions.

Computer system 500 may be coupled via bus 502 to a display 512, such as a cathode ray tube (CRT) or a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical, magnetic, or magneto-optical disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface.518.

The received code may be executed by processor 504 as it is received, and/or stored in storage device 5 10, or other non-volatile storage for later execution. In this manner, computer system 500 may obtain application code in the form of a carrier wave.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, references have been made to the SQL database query language and examples of queries using SQL have been utilized throughout to aid in describing the invention. However, the techniques described herein are not limited to any database query language. For another example, the techniques described are based on the use of sort-based algorithms for computing rollup operators and aggregate functions. However, the techniques described herein are not limited to use with sort-based query evaluation algorithms, but may be used in conjunction with algorithms that do not group records by sorting. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for evaluating a database query that includes a specification of a set of groupings for grouping results, the method comprising the steps of:

reducing the specification to one or more combinations of groupings of the set of groupings;

determining a respective GROUP BY clause for computing a respective combination of groupings from the one or more combinations of groupings; and generating result records for each grouping of the set of groupings based in part on the respective GROUP BY clause.

2. The method of claim 1, wherein the respective GROUP BY clause is a simple GROUP BY clause, and the step of determining is performed according to the simple GROUP BY clause.

3. The method of claim 1, wherein the respective GROUP BY clause is a GROUP BY clause with a ROLLUP operator, and the step of determining is performed according to the GROUP BY clause with the ROLLUP operator.

4. The method of claim 1 wherein the step of reducing the specification reduces to more than one combination of groupings, and wherein the step of generating result records generates, for each respective GROUP BY clause, result records for two or more groupings from the set of groupings, the method further comprising the steps of:

computing from records retrieved from a base table a first respective GROUP BY clause; and computing from records generated by computation of the first respective GROUP BY clause a second respective GROUP BY clause.

5. The method of claim 4, wherein a respective GROUP BY clause is computed from records for one of the two or more groupings generated by another respective GROUP BY clause, the method further comprising the steps of:

storing in respective temporary tables groupings of the two or more groupings that are used to compute a respective GROUP BY clause;

storing in a sink temporary table groupings of the two or more groupings that are not used to compute another GROUP BY clause;

combining the respective temporary tables and the sink temporary table to generate a query result.

6. The method of claim 1 wherein the step of generating result records generates, for each respective GROUP BY clause, result records for two or more groupings of the set of groupings, and wherein the step of determining a respective GROUP BY clause comprises the steps of:

estimating, for each grouping from the set of groupings, a cardinality for each grouping;

considering the groupings of the set of groupings, in descending order of cardinalities, (a) determining a first grouping to compute, the first grouping having the largest cardinality of the set of groupings, wherein the first grouping is computed from records retrieved from at least one base table;

(b) determining, for a next grouping, a grouping from which to compute the next grouping, comprising, considering groupings that have been considered, in ascending order of cardinalities, (i) determining, from groupings that have not been used to compute another grouping, a grouping with the smallest cardinality from which the next grouping can be computed without sorting records from the grouping, if any;

(ii) if a grouping is determined in step (i), then representing the next grouping and the grouping determined in step (i) as a respective GROUP BY clause;

(iii) if there are no groupings from which the next grouping can be computed without sorting the records, then, determining a grouping with the smallest cardinality from which the next grouping can be computed with sorting records from the grouping;

(c) repeating step (b) until all groupings have been represented as part of a GROUP BY clause.

7. The method of claim 6, wherein the step of representing the groupings as a respective GROUP BY clause represents the groupings as a respective GROUP BY clause with a rollup operator.

8. The method of claim 6 wherein the step of estimating a cardinality for each grouping is based on an estimate of the number of result records generated by computation of each grouping.

9. A method for generating an evaluation plan for a database query that includes a specification of a set of groupings for grouping results, the method comprising the steps of:

estimating, for each grouping from the set of groupings, a cardinality for each grouping;

considering the groupings of the set of groupings, in descending order of cardinalities, (a) determining a first grouping to compute, the first grouping having the largest cardinality of the set of groupings, wherein the first grouping is computed from records retrieved from at least one base table;

(b) determining, for a next grouping, a grouping from which to compute the next grouping, comprising, considering groupings that have been considered, in ascending order of cardinalities, (i) determining, from groupings that have not been used to compute another grouping, a grouping with the smallest cardinality from which the next grouping can be computed without sorting records from the grouping, if any;

(ii) if a grouping is determined in step (i), then representing the next grouping and the grouping determined in step (i) as a GROUP BY clause;

(iii) if there are no groupings from which the next grouping can be computed without sorting the records, then, determining a grouping with the smallest cardinality from which the next grouping can be computed with sorting records from the grouping;

(c) repeating step (b) until all groupings have been represented as part of a GROUP BY clause; and (d) generating the evaluation plan for the query as a combination of the GROUP BY clauses.

10. The method of claim 9, further comprising the step of:

for a grouping from which another grouping is computed, specifying a table to which grouping result records for the grouping are stored; for groupings from which no other grouping is computed, specifying a sink table to which grouping result records for the groupings are stored.

11. The method of claim 9, further comprising the steps of:

for two or more groupings of the set of groupings that can be computed with sorting records from another grouping, determining whether the two or more groupings can be computed from a particular grouping not in the set of groupings, with less computational costs than if computed from the another grouping; and wherein the step of generating the evaluation plan includes, specifying computation of the particular grouping from the another grouping; and specifying computation of the two or more groupings from the particular grouping.

12. The method of claim 9, wherein the step of representing the groupings is performed such that the groupings are represented as a simple GROUP BY clause.

13. The method of claim 9, wherein the step of representing the groupings is performed such that the groupings are represented as a GROUP BY clause with a rollup operator.

14. A computer-readable medium carrying one or more sequences of instructions for evaluating a database query that includes a specification of a set of groupings for grouping results, wherein execution of the one or more sequences of instructions by one or more processors causes the one or more processors to perform the steps of:

reducing the specification to one or more combinations of groupings of the set of groupings;

determining a respective GROUP BY clause for computing a respective combination of groupings from the one or more combinations of groupings; and generating result records for each grouping of the set of groupings based in part on the respective GROUP BY clause.

15. The computer-readable medium of claim 14, wherein the respective GROUP BY clause is a simple GROUP BY clause, and wherein execution of the one or more sequences of instructions by one or more processors causes the one or more processors to perform the step of determining according to the simple GROUP BY clause.

16. The computer-readable medium of claim 14, wherein the respective GROUP BY clause is a GROUP BY clause with a ROLLUP operator, and the step of determining is performed according to the GROUP BY clause with the ROLLUP operator.

17. The computer-readable medium of claim 14 wherein execution of the one or more sequences of instructions by one or more processors causes the one or more processors to perform the steps of:
computing from records retrieved from a base table a first respective GROUP BY clause; and
computing, from records generated by computation of the first respective GROUP BY clause, a second respective GROUP BY clause.

18. The computer-readable medium of claim 17, wherein a respective GROUP BY clause is computed from records for one of the two or more groupings generated by another respective GROUP BY clause, and wherein execution of the one or more sequences of instructions by one or more processors causes the one or more processors to perform the steps of:
storing in respective temporary tables groupings of the two or more groupings that are used to compute a respective GROUP BY clause;
storing in a sink temporary table groupings of the two or more groupings that are not used to compute another GROUP BY clause;
combining the respective temporary tables and the sink temporary table to generate a query result.

19. The computer-readable medium of claim 14 wherein the step of generating result records generates, for each respective GROUP BY clause, result records for two or more groupings of the set of groupings, and wherein execution of the one or more sequences of instructions by one or more processors causes the one or more processors to perform the step of determining a respective GROUP BY clause by performing the steps of:
estimating, for each grouping from the set of groupings, a cardinality for each grouping;
considering the groupings of the set of groupings, in descending order of cardinalities,
(a) determining a first grouping to compute, the first grouping having the largest cardinality of the set of groupings, wherein the first grouping is computed from records retrieved from at least one base table;
(b) determining, for a next grouping, a grouping from which to compute the next grouping, comprising,
considering groupings that have been considered, in ascending order of cardinalities,
(i) determining, from groupings that have not been used to compute another grouping, a grouping with the smallest cardinality from which the next grouping can be computed without sorting records from the grouping, if any;
(ii) if a grouping is determined in step (i), then representing the next grouping and the grouping determined in step (i) as a respective GROUP BY clause;
(iii) if there are no groupings from which the next grouping can be computed without sorting the records, then,
determining a grouping with the smallest cardinality from which the next grouping can be computed with sorting records from the grouping;
(c) repeating step (b) until all groupings have been represented as part of a GROUP BY clause.

20. The computer-readable medium of claim 19, wherein execution of the one or more sequences of instructions by one or more processors causes the one or more processors to perform the step of representing the groupings as a respective GROUP BY clause by representing the groupings as a respective GROUP BY clause with a rollup operator.

21. The computer-readable medium of claim 19 wherein execution of the one or more sequences of instructions by one or more processors causes the one or more processors to perform the step of estimating a cardinality for each grouping based on an estimate of the number of result records generated by computation of each grouping.

22. A computer-readable medium carrying one or more sequences of instructions for generating an evaluation plan for a database query that includes a specification of a set of groupings for grouping results, wherein execution of the one or more sequences of instructions by one or more processors causes the one or more processors to perform the steps of:
estimating, for each grouping from the set of groupings, a cardinality for each grouping;
considering the groupings of the set of groupings, in descending order of cardinalities,
(a) determining a first grouping to compute, the first grouping having the largest cardinality of the set of groupings, wherein the first grouping is computed from records retrieved from at least one base table;
(b) determining, for a next grouping, a grouping from which to compute the next grouping, comprising,
considering groupings that have been considered, in ascending order of cardinalities,
(i) determining a grouping with the smallest cardinality from which the next grouping can be computed without sorting records from the grouping, if any;
(ii) representing the next grouping and the grouping determined in step (i) as a GROUP BY clause;
(iii) if there are no groupings from which the next grouping can be computed without sorting the records, then,
determining a grouping with the smallest cardinality from which the next grouping can be computed with sorting records from the grouping;
(c) repeating step (b) until all groupings have been represented as part of a GROUP BY clause; and
(d) generating the evaluation plan for the query as a combination of the GROUP BY clauses.

23. The computer-readable medium of claim 22, wherein execution of the one or more sequences of instructions by one or more processors causes the one or more processors to perform the steps of:
for a grouping from which another grouping is computed, specifying a table to which grouping result records for the grouping are stored;
for groupings from which no other grouping is computed, specifying a sink table to which grouping result records for the groupings are stored.

24. The computer-readable medium of claim 22, wherein execution of the one or more sequences of instructions by one or more processors causes the one or more processors to perform the steps of:
for two or more groupings of the set of groupings that can be computed with sorting records from another grouping,
determining whether the two or more groupings can be computed from a particular grouping not in the set of groupings, with less computational costs than if computed from the another grouping; and wherein the step of generating the evaluation plan includes,
specifying computation of the particular grouping from the another grouping; and
specifying computation of the two or more groupings from the particular grouping.

25. The computer-readable medium of claim 22, wherein execution of the one or more sequences of instructions by one or more processors causes the one or more processors to perform the step of representing the groupings such that the groupings are represented as a simple GROUP BY clause or as a GROUP BY clause with a rollup operator.

26. A computer apparatus comprising:
a memory; and
one or more processors coupled to the memory and configured to execute one or more sequence of instructions for evaluating a database query that includes a specification of a set of groupings for grouping results, wherein execution of the one or more sequences of instructions by one or more processors causes the one or more processors to perform the steps of:
reducing the specification to one or more combinations of groupings of the set of groupings;
determining a respective GROUP BY clause for computing a respective combination of groupings from the one or more combinations of groupings; and
generating result records for each grouping of the set of groupings based in part on the respective GROUP BY clause.

27. A computer apparatus comprising:
a memory; and
one or more processors coupled to the memory and configured to execute one or more sequence of instructions for generating an evaluation plan for a database query that includes a specification of a set of groupings for grouping results, wherein execution of the one or more sequences of instructions by one or more processors causes the one or more processors to perform the steps of:
estimating, for each grouping from the set of groupings, a cardinality for each grouping;
considering the groupings of the set of groupings, in descending order of cardinalities,
(a) determining a first grouping to compute, the first grouping having the largest cardinality of the set of groupings, wherein the first grouping is computed from records retrieved from at least one base table;
(b) determining, for a next grouping, a grouping from which to compute the next grouping, comprising,
considering groupings that have been considered, in ascending order of cardinalities,
(i) determining a grouping with the smallest cardinality from which the next grouping can be computed without sorting records from the grouping, if any;
(ii) representing the next grouping and the grouping determined in step (i) as a GROUP BY clause;
(iii) if there are no groupings from which the next grouping can be computed without sorting the records, then,
determining a grouping with the smallest cardinality from which the next grouping can be computed with sorting records from the grouping;
(c) repeating step (b) until all groupings have been represented as part of a GROUP BY clause; and
(d) generating the evaluation plan for the query as a combination of the GROUP BY clauses.

* * * * *

UNITED STATES PATENT AND TRADEMARK OFFICE
CERTIFICATE OF CORRECTION

| | | |
|---|---|---|
| PATENT NO. | : 6,775,681 B1 | Page 1 of 1 |
| APPLICATION NO. | : 10/084597 | |
| DATED | : August 10, 2004 | |
| INVENTOR(S) | : Srikanth Bellamkonda | |

It is certified that error appears in the above-identified patent and that said Letters Patent is hereby corrected as shown below:

On The Title Page
(75) Inventors:

Please delete "Srikanth Ballamkonda" and insert --Srikanth Bellamkonda--.

Signed and Sealed this

Third Day of July, 2007

JON W. DUDAS
*Director of the United States Patent and Trademark Office*